Nov. 16, 1971   H. KORNER   3,620,102
ADJUSTABLE ROLLER WORM GEAR ARRANGEMENTS
Filed April 10, 1970   3 Sheets-Sheet 1

INVENTOR
HELMUT KÖRNER
BY
Nolte & Nolte
ATTORNEYS

United States Patent Office 3,620,102
Patented Nov. 16, 1971

3,620,102
ADJUSTABLE ROLLER WORM GEAR
ARRANGEMENTS
Helmut Korner, 12 Wichernstrasse,
D–3340 Wolfenbuttel, Germany
Filed Apr. 10, 1970, Ser. No. 27,247
Claims priority, application Germany, Apr. 12, 1969,
P 19 18 721.4
Int. Cl. F16h 15/50
U.S. Cl. 74—796
17 Claims

ABSTRACT OF THE DISCLOSURE

An adjustable roller worm gear arrangement is disclosed. The gear arrangement comprises an input shaft supporting a carrier carrying a number of rolling elements which rotate in a planetary path around the input shaft when the latter is driven. The rolling elements successively engage helical grooves in a worm wheel which is mounted on an output shaft transversely inclined to the input shaft. Circumferential portions of each rolling element contact a pair of adjacent annular track members, which are mounted on the input shaft and which define the walls of a groove for the rolling elements. The gear arrangement is provided with means for displacing at least one of the pairs of track members to vary the inclination of the walls of the groove and hence the mean radius of contact circles defined by points of contact between the rolling elements and the walls of the groove, whereby the transmission ratio of the gear arrangement may be varied.

BACKGROUND OF THE INVENTION

The present invention relates to adjustable roller worm gear arrangements. It has been proposed to provide roller worm gear arrangements which comprise two transversely orientated shafts, one of which, the input shaft, supports a carrier carrying a ring of rolling elements which engage helical threads in a worm gear mounted on the other shaft, which forms the output shaft of the gear arrangement. The rolling elements run in a groove on the input shaft of the gear arrangement and come into engagement in succession with screw-threads of variable pitch on the worm wheel. The rolling elements are arranged to maintain two-point contact in the groove on the input shaft and in the respective screw-threads in the worm gear regardless of osculation.

A problem associated with such known gear arrangements consists in providing adjustability of the radius of the contact circles defined by the successive points of contact between the ring of rolling elements and the walls of the groove in the input shaft so that the angular velocity of the output shaft may be varied steplessly for control purposes. It may be necessary to vary the rotational speed of the output shaft at frequent intervals or only on infrequent occasions, so as to provide periodic re-adjustment of the roller worm gear arrangement. A gear arrangement which provides the facility for adjusting steplessly both the output rotational speed and the output moment, within a limited adjustment range, would be applicable to a wider field of applications than known gear arrangements which do not provide this facility.

SUMMARY OF THE INVENTION

According to the present invention, there is provided an adjustable roller worm gear arrangement comprising an input shaft supporting a carrier carrying a plurality of rolling elements, a roller worm gear provided with a plurality of helical grooves for respectively engaging successive rolling elements and mounted on an output shaft which is transversely inclined with respect to the input shaft, circumferential portions of each rolling element contacting a pair of adjacent annular track members which are mounted on the input shaft and define the walls of the groove for the rolling elements, and displacement means for displacing at least one of the adjacent annular track members to vary the radius of contact circles defined by successive points of contact between the rolling elements and the walls of the groove, whereby the transmission ratio of the gear arrangement may be varied.

BRIEF DESCRIPTION OF THE DRAWINGS

Embodiments of the present invention will now be more particularly described with reference to the accompanying drawings, in which.

DESCRIPTION OF THE PREFERRED EMBODIMENTS

Figure 1:
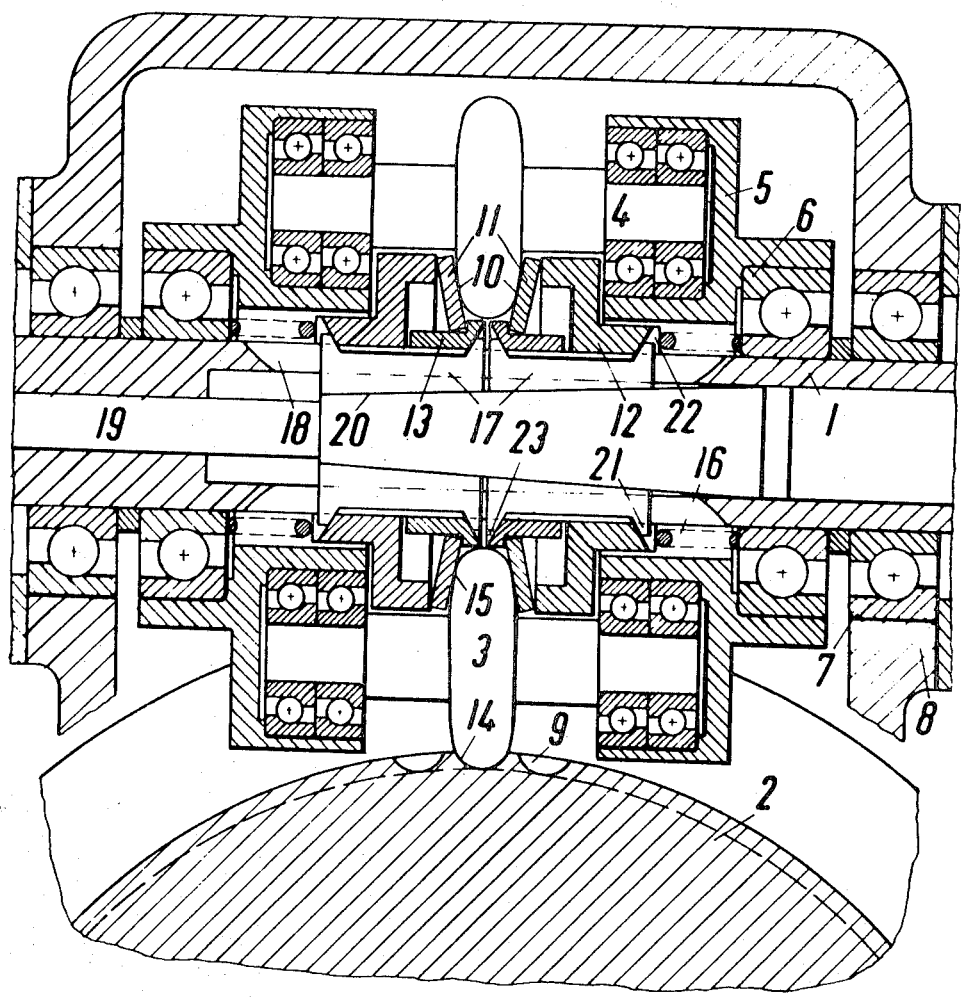
FIG. 1 shows a sectional elevation of an adjustable roller worm gear arrangement according to a first embodiment of the invention.

In the embodiment illustrated in FIG. 1 the rolling elements are disposed between an input drive shaft 1 and an output driven worm wheel 2 in the form of planetary rollers 3, which are mounted by fixed shaft ends 4 in a common roller carrier 5. This roller carrier 5 takes all the forces on the planetary rollers 3 from the worm wheel 2 and is likewise mounted, by means of angular contact ball bearings 6 on the input drive shaft 1. By means of these bearings 6, the forces from the roller carrier 5 are transmitted to the bearings 7 of the input drive shaft 1, which are likewise in the form of angular contact ball bearings. An end support is provided on the outer ring of these bearings 7 by means of parts of a gear casing 8.

The worm wheel 2 is provided in known manner, on its periphery, with parts of screw-threads 9 of variable pitch, with which the planetary rollers 3 come into engagement in succession as they rotate with their carrier 5, thereby rotating the worm wheel 2. Depending on the desired rotational speed ratio and depending on the loading of the gear arrangement, the roller carrier 5 may contain two, three, four or even more rollers 3; the number of screw-threads 9 on the worm wheel 2 may also vary in accordance with these conditions.

A divided track groove 10 for driving the planetary rollers 3 is defined by two track rings 11, which are each capable of deflection after the style of cup springs. An outer peripheral edge of each of the track rings 11 bears elastically against a part 12 of the input drive shaft 1 and their inner peripheral edge bears against another shaft part 13. The frictional force between the track rings 11 and the shaft parts 12 and 13 is sufficient to transmit the torque from the input drive shaft 1, without the slip. Because of the construction of the gear arrangement, and particularly because of a type of mounting of the planetary rollers 3, the track rings 11 are substantially unaffected, in any disadvantageous manner, by the considerable forces produced by the interaction between the planetary rollers 3 and the worm wheel 2.

For the purpose of engagement with the screw-threads 9 of the worm wheel 2, the planetary rollers 3 have a semi-circular profile 14, while for the variable contact between the planetary rollers 3 and the track rings 11 a shallow convex curvature 15 extending almost to their shaft extension is provided on each of the planet rollers 3. This curvature permits the diameter of the circle of contact between the planetary rollers 3 and the track rings 11 to be adjusted, thus improving the range of adjustment. For the uniform variation of the pressure angle of the track rings 11 on the planetary rollers 3 and consequently for the uniform variation of the diameter of the contact track circles on these parts, the shaft parts 12 and 13 are slidably mounted on the input drive shaft 1 so as to permit adjustment of the cone angle defined between the track rings 11. The shaft parts 12 and 13 can in fact be displaced either singly or simultaneously in relation to one another. Simultaneous displacement of the shaft parts 12 and 13 occurs as a compensating movement simultaneously with the individual displacement when the cone angle of the track rings 11 is adjusted for the purpose of controlling rotational speed. The entire system of supporting shaft parts is thus mounted so as to float on the drive shaft 1 and may be adjusted with respect to the planetary rollers 3. The necessary contact pressure of the track rings 11 on the planetary rollers 3 is produced, and for each adjustment is maintained by a compression spring 16 for each track ring 11. The spring 16 acts on the outer shaft part 12 and is supported against the inner ring of the respective bearing 6 of the roller carrier 5.

Special measures are provided for displacing the shaft parts 12 and 13 to adjust the gear arrangement. For this purpose, at least two pairs of longitudinally movable feather keys 17 are spaced uniformly apart on the periphery of the input drive shaft 1. The keys 17 fit in longitudinal slots 18 in the drive shaft 1, which is in the form of a hollow shaft. A longitudinally slidable adjusting rod 19 is mounted in the hollow shaft 1 and rotates with the shaft. The rod 19 may be displaced along the shaft 1 from the outside by means of an axial bearing to control the rotational speed. This adjusting rod 19 has a slender run-up cone 20 which engages each of the feather keys 17. At the ends of their contour not adjoining the run-up cone 20, the keys 17 are provided with projections 21 having inclined surfaces which face one another and by means of which the feather keys 17 act from outside, after the style of clamps, on the shaft parts 12 and 13 to support and displace the track rings 11. The feather keys 17 slide on the cone 20 when the adjusting rod 19 is displaced so as to open up the feather keys 17 uniformly in the radially outward direction. For the purpose of driving engagement with the feather keys 17, the shaft parts 12 and 13 are provided on their end faces with grooves 22 and 23 having inclined faces adapted to engage the inclined faces of the feather key projections 21.

All portions which slide against one another on displacement under pressure are hardened and polished. The run-up angles on the adjusting rod 10 and the feather keys 17 are so arranged that a high transmission ratio is obtained for the operating force applied to displace the adjustment rod 19 in order to ensure effortless adjustment of the gear arrangement, for which purpose a long displacement path is available on the adjustment rod 19. The angle on the run-up cone 20 of the adjusting rod is kept small in order to ensure the most uniform possible contact pressure between the two track rings 11 and the planetary rollers 3.

As a modification of the construction which is illustrated in FIG. 1, instead of the planetary rollers 3 with the roller carrier 5, cage-guided balls are provided. These balls are driven by track rings having a concave running track in osculating contact with the balls. The track rings may be so arranged that their pressure angle in relation to the balls can be adjusted in the same way as has been described with reference to FIG. 1. For this purpose, it is advisable that the degree of osculation of the track rings in relation to the balls should not be made too great and that the track rings of curved profile should be given a uniform wall thickness, so that on the side not in contact with the balls they have a basically conical shape with a highly curved generating line.

The adjustment rod 19 can be operated manually, hydraulically, pneumatically or otherwise for all embodiments. For the purpose of manual operation, it is preferable to provide means having an adjusting screw-thread and acting on the adjusting rod 19 through the previously mentioned axial thrust bearing. In the embodiment of the invention illustrated in FIG. 2, balls are provided as the rolling elements, there is provided for each pair of shafts parts 24 and 25 an adjusting ring 26 having an internal screw-thread and an external screw-thread with the same pitch direction but with different pitches for the elastic deformation of the two track discs 27 and 28. The adjusting rings 26 are respectively connected to the two shaft parts 24 and 25, which are adjustable in relation to one another, for each track disc 27 and 28, and when rotated displace them uniformly towards one another because of the difference of the pitch of their respective screw-threads, so that uniform displacement of the pressure angle of the balls 29 in the track groove 30 in the guide shaft of the gear arrangement is achieved.

The two adjusting rings 26 are drivingly connected together by a rotatable adjusting spindle 31, which by means of driving lugs 32 at each end engages in respective slots provided on the end faces of the adjusting rings 26. The adjusting spindle 31 maintains the two shaft parts 24 and 25 centered in relation to one another. By means of a tool which has a slot on its end face and which acts on the driving lugs 32, the adjusting spindle 31 can be adjusted from both sides through the hollows in the shaft parts 24. A driver pin 33 also ensures in this construction that all the shaft parts will be incapable of rotation in relation to one another, the driving connection between the shaft parts 25 and the track discs 27 and 28 being obtained through tight fitting of these track discs on the shaft parts 25.

Figure 2:
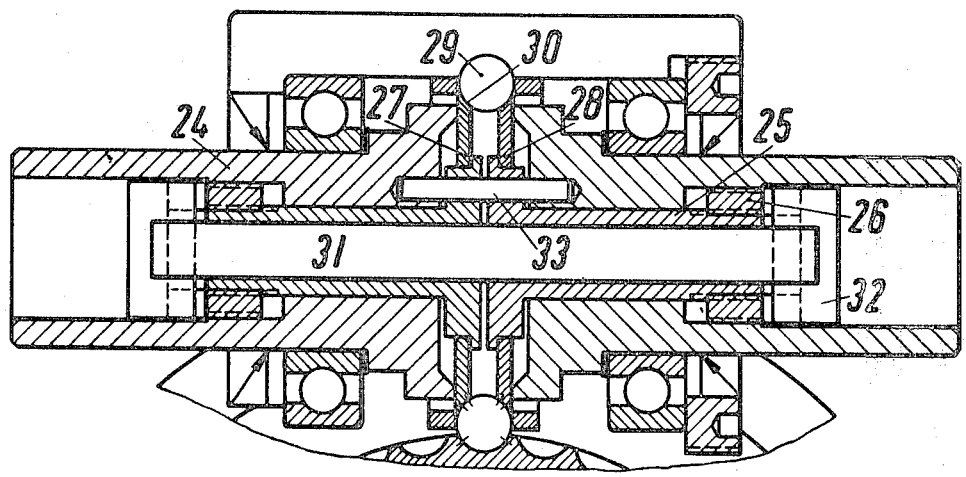
FIG. 2 shows a sectional elevation of an adjustable roller worm gear arrangement according to a second embodiment of the invention.

The construction illustrated in FIG. 2 is suitable for occasional adjustment of the gear arrangement when the latter is stationary, for example, for occasional tuning or re-adjustment of the output rotational speed to any desired value within a determined range of adjustment.

Figure 3:
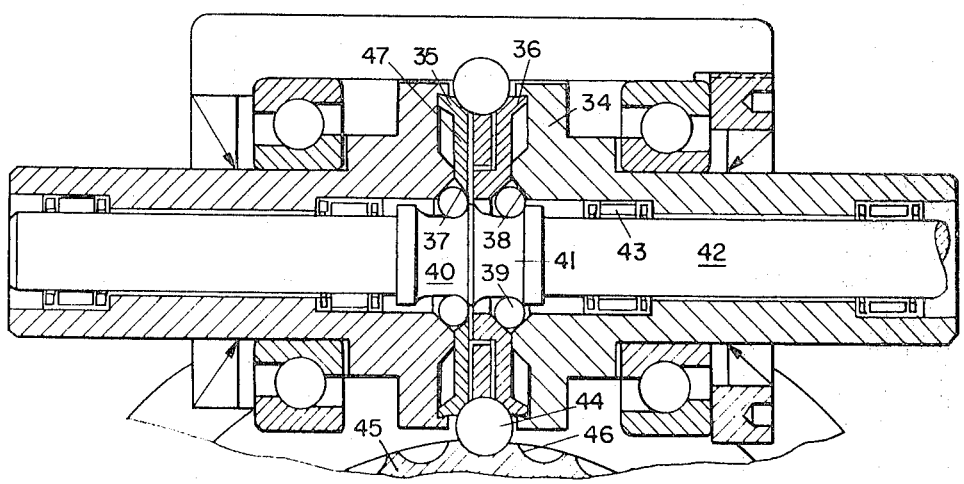
FIG. 3 shows a sectional elevation of an adjustable roller worm gear arrangement according to a third embodiment of the invention.

In the embodiment of the invention illustrated in FIG. 3, two track discs 35 and 36 are provided which are made fast by their outer edges to respective shaft parts 34 and which, in this connection, are supported axially in both directions at their outer edge by the shaft parts 34. For this purpose the track discs 35 and 36 are pressed or driven into the shaft parts 34 by their outer edge, so as to obtain a slightly conical connection. Similarly to the shaft parts 34, the track discs 35 and 36 are provided at their inner edge with a conical recess 37 facing the conical recess 38 in the respective shaft parts 34, for a ring of balls 39 which rotate, in the case of each ring, on run-up cones 40 and 41 on a non-rotating, longitudinally slidable adjusting rod 42. This adjusting rod 42 holds the shaft parts 34 centered in relation to one another by means of needle bearings 43.

When the adjusting rod 42 is operated, it moves the inner edge of the track discs 35 and 36 uniformly away from the supporting shaft parts 34, by means of the balls 39, which are thereby also moved radially outwards so as to provide a uniform variation of the pressure angle with the balls 44. Through a kind of spur toothing, the track discs 35 and 36 are maintained permanently in engagement with one another so that a reciprocal driving connection is established between the two shaft parts 34. Unlike the embodiment illustrated in FIG. 2, the balls 44, which come into engagement with the screw-threads 46 on the worm gear 45, are not guided in bores in a cage ring in this construction but in peripheral recesses in a cage disc 47.

Figure 4:
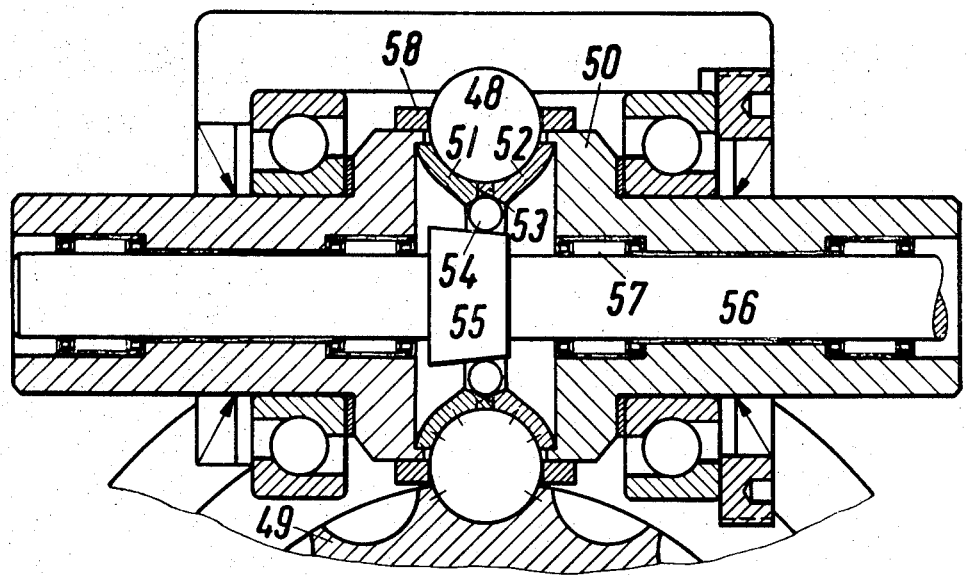
FIG. 4 shows a sectional elevation of an adjustable roller worm gear arrangement according to a fourth embodiment of the invention.

In FIG. 4, the balls 48 which transmit the driving torque to the worm gear 49 are provided with two track rings 51 and 52, each of which is made fast by its outer edge to a shaft part 50 which supports the track rings 51 and 52 radially and axially from outside. The track rings 51 and 52 have on the inside and on the outside a basically conical shape with a concavely generating line, the inner edges of the track rings 51 and 52 abut against one another. In addition, on their inner edges the track rings 51 and 52 have mutually facing conical recesses 53 which engage a common ring of balls 54. The ring of balls 54 rotate on a common run-up cone 55 which is mounted on a non-rotating, longitudinally slidable adjusting rod 56. As in FIG. 3, the adjusting rod 56 maintains the two shaft parts 50 centered in relation to one another by means of needle bearings 57.

On displacement of the adjusting rod 56, the track rings 51 and 52 are adjusted by their inner edge to a greater or lesser extent towards the ring of transmitting balls 48, by means of the balls 54 which are thereby moved outwards by the run-up cone 55, for the uniform variation of the pressure angle on the balls 48. On the yielding of the supporting shaft parts 50, the outer edges of the track rings 51 and 52 are thereby lifted off the balls 48. By means of teeth on the inner edges of the track rings 51 and 52, all parts are connected together for mutual driving. The balls 48 are guided in bores in a cage ring 58.

Figure 5:
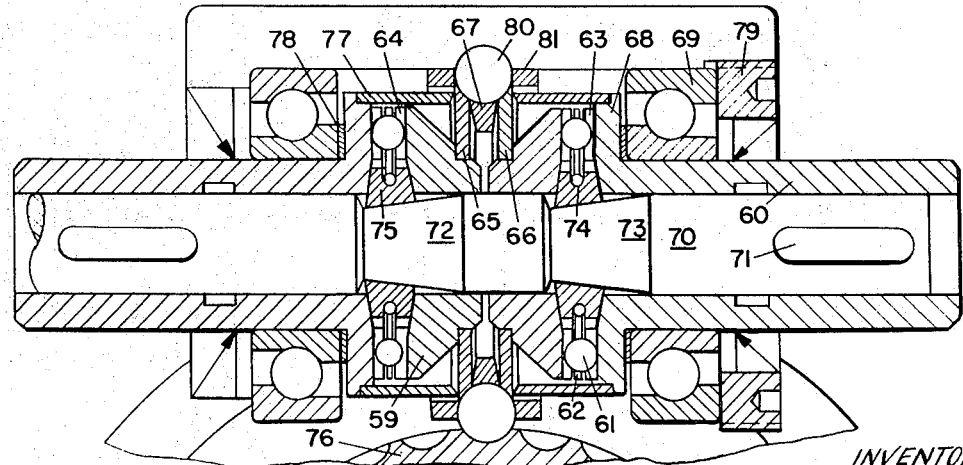
FIG. 5 shows a sectional elevation of an adjustable roller worm gear arrangement according to a fifth embodiment of the invention.

The embodiment of the invention illustrated in FIG. 5 provides facilities for load-dependent automatic adjustment of the gear arrangement in addition to adjustability of rotational speed and torque through the displacement of an adjusting shaft. The particular feature serving this end in the construction of this gear arrangement is that for each group of shaft parts 59 and 60 there is provided a pressing device which works automatically in dependence on the torque on the shaft. Each pressing device comprises a ring of balls 61 mounted in a cage disc 62 between run-up ramps 63 and 64 which, for the purpose of uniform load-dependent elastic deformation of the track discs 65 and 66, move the two shaft parts 59 so as to have a more or less intensive action on the inner edge of the track discs 65 and 66, the track discs being mutually supported by a common supporting ring 67 near their outer edge. The two outer shaft parts 60 of the entire unit are supported against a shaft bearing 69 (an angular contract roller bearing) in each case. The shaft parts 60 are each provided with collars 68 and the inner faces of the collars are provided with ramps 63. By means of a shaft 70 centering the two groups of shaft parts 59 and 60 in relation to one another and provided with feather keys 71, the two outer shaft parts 60 are connected together.

To adjust the gear arrangement whilst it is operating, the shaft 70 may be longitudinally displaced so as to adjust the position of the run-up cones 72 and 73. Cone pressure segments 75, having conical pressure surfaces on the end faces and on the inner side, are mounted radially on the cones 72 and 73. The segments 75 are acted on by a contracting embracing spring 74. Additionally to the load-dependent automatic adjustment of the shaft parts 59 through the two pressing devices with balls 61 and run-up ramps 63 and 64, through adjustment of the shaft 70 by the operator this construction also permits operation in any desired manner of the shaft parts 59 for the uniform deformation of the track discs 65 and 66 and thus also any desired reduction of the rotational speed at the output side of the gear arrangement. Any desired increase in the speed of rotation of the gear arrangement is thus also possible if a predetermined minimum load moment on the gear arrangement is not exceeded; this increase is, however, prevented automatically as soon as the load moment increases and thus the shaft parts 59 together with the track discs 65 and 66 can be adjusted through increased running-up of the balls 61. The longitudinal movement of the adjusting shaft 70 for the uniform operation of all the pressure segments 75 against the force of the embracing spring 74, and consequently for the uniform opening out of the shaft parts 59 and 60, can be effected in this embodiment also by means of levers or pressure or tension means of any kind with the aid of an axial bearing for separating the rotational movement of the adjusting shaft 70 from the pushing adjusting movement.

In the limit case, the gearing shown in FIG. 5 can be adjusted downwards steplessly to its lowest possible output speed of rotation on the gear 76 automatically from its highest possible speed through the action of the two pressing devices, this output speed offering maximum output torque with uniform driving torque. If after manual adjustment of the gearing by the adjusting shaft 70 the load moment should further exceed the adjusted magnitude, the two pressing devices would automatically adjust the gearing still further downwards, through the consequent increased running-up of the balls 61, until a condition of equilibrium is restored between the driving power and the output power of the gearing, disregarding the slight losses in the gearing. With the above-described properties of the embodiment shown in FIG. 5, the gearing in this embodiment provides still greater versatility of use in driving and control technique.

For each group of shaft parts a supporting ring 77, which is made fast to the respective outer shaft parts 60, supports the track disc 65 or 66 at their outer edges. As is also the case in the embodiments illustrated in FIGS. 2 to 4, slight axial compensating movements of the outer shaft parts 60 supporting the track discs 65 and 66, such as necessarily occur on the adjustment of the gearing with the elastic deformation of the track discs 65 and 66, are absorbed by cup springs 78 between these shafts parts 60 and the shaft bearings 69. In addition, adjustability is also provided at the supporting shaft parts 60 through one of these bearings 69, as is also the case in the other embodiments, by a threaded adjusting ring 79, against which the bearing 69 bears by means of its outer track ring. The supporting ring 67 between the track discs 65 and 66 is made so narrow and lies so tightly against the outer edge of the track discs on its inner side that, under the most unfavourable operating conditions, only very slight radial clearance exists for the transmitting balls 80 between the track discs 65 and 66 and the worm gear 76. The supporting ring 67 is of primary importance for the mutual supporting and guiding of the track discs 65 and 66 in the unloaded zone beyond the screw-threads of the worm gear 76, through which the balls 80 in their cage ring 81 pass without compressive force between the track discs 65 and 66.

To permit consideration of the range of adjustment of the rotational speed and torque which can be achieved with a rolling contact worm gear arrangement embodying the invention, the following design magnitudes will be assumed for an embodiment with balls in accordance with the example shown in FIG. 4, which magnitudes can without difficulty be achieved in practice. In this gearing it will be assumed that the diameter $d_K$ of the balls 48 amount to 20 mm. and that their pitch circle diameter $d_o$ is equal to 60 mm. The pressure angle $\alpha_W$ of the balls at the track rings 51 and 52, which is steplessly variable in accordance with the adjustment of the gear arrangement, is assumed to amount to 30° at one end position and 60° at the other end position, measured from the plane of the ring of balls. The pressure angle $\alpha_R$ of the balls 48 on the wheel 49 will be assumed to have the invariable value of 60°.

In accordance with the driving speed of rotation $n_1$ of the gearing, the rotational speed $n_o$ of the ring of balls 48, which is proportional to the output speed, is calculated with adequate accuracy with these design values from the following formula:

$$n_o = \frac{d_K \cdot \cos \alpha_R \cdot (d_o - d_K \cdot \cos \alpha_W) n_1}{d_K \cdot \cos \alpha_W \cdot (d_o + d_K \cdot \cos \alpha_R) + d_K \cdot \cos \alpha_R \cdot (d_o - d_K \cdot \cos \alpha_W)}$$

If the above-mentioned numerical values are inserted, calculation for one end position in the control range will give a rotational speed ratio between the driving speed of the gearing and the speed of rotation of the ring of balls 48 of $i_{max} = 3.84$ and for the other limit a speed ratio of $i_{min} = 2.4$. These two limit speed ratios provide a control range for the output speed of the worm gear 49 of 1.6 with fair accuracy. The output torque at the worm gear 49 can thus also be varied by up to 1.6 times, with the same driving torque. In principle, and also in practice under certain conditions, it is possible to achieve a still larger conversion ratio with a gear arrangement embodying the invention, while conversion ratios of such values can also be achieved with embodiments of the type shown in FIG. 1. Owing to the fact that a number of variable construction sizes exist for gear arrangements, great latitude exists in the design of the gear arrangement in respect of transmission ratio, adjustment range, and loadability.

Steplessly adjustable gear arrangements of other constructions, for example those with friction wheels or fluid transmission, usually have a substantially larger range of adjustment for the output speed. In contrast therewith a gear arrangement embodying the invention has the advantage that, they can transmit far greater powers with the same overall dimensions of the gear arrangement and make it possible to dispense with the secondary gearings which are often necessary. The forces on the transmitting balls or planetary rollers of a gear arrangement embodying the invention, as with those on the tooth flanks of conventional gear trains, are equal to the peripheral forces from the moments to be transmitted. Gear arrangements embodying the invention provide the advantage over known steplessly adjustable gear arrangements of having a substantially better transmission efficiency. Over the entire range of adjustment this efficiency may be higher than 0.95, while no slip, such as occurs with friction wheels, is experienced.

In the embodiment illustrated in FIGS. 3 and 4 a modification comprises guiding the adjusting rod 42 (FIG. 3) outside the gearing shaft in a part fastened to the casing, in such a manner that its longitudinal movement for the adjustment of the gear arrangement is effected by rotation, for example with the aid of a screw-thread. This measure also permits adjustment of the gear arrangements when stationary, because the balls 39 are displaced outwardly by rotation of the run-up cones 40 and 41 on the adjusting rod 42, whereby the sliding of the balls 39 on the run-up cones, and consequent damage to these parts, is avoided.

Another modification of the invention comprises the provision of run-up cones on adjusting rods which instead of having a linear generatrix, have a generatrix extending in a predetermined curve. Adaptation of the movement pattern of these parts to a determined speed adjustment characteristic is thus possible, as is appropriate for some control purposes.

In further development of the embodiment illustrated in FIG. 1, rows of small balls or rollers may also be provided between the feather keys 17 and the adjusting rod 19, in order to obtain particularly easy running for the adjustment of the gearing. These balls or rollers may run in grooves receiving them in the adjusting rod, the bottom of the groove extending obliquely in each case to match the contour of the feather keys 17 lying against it, in order to ensure running-up on the keys. The invention is not limited to the use of any particular arrangement of the adjusting means which are used to displace the track discs to provide stepless variation of their pressure angle with the roller elements.

I claim:
1. A roller worm gear arrangement comprising in combination;
   an input shaft,
   an output shaft transversely inclined to said input shaft,
   a carrier member rotatably supported on said input shaft,
   a plurality of rolling elements rotatably mounted on said carrier member,
   a worm gear wheel mounted on said output shaft,
   a pair of annular track members mounted on said input shaft and defining respectively opposite walls of a divided track groove,
   said rolling elements being in rolling contact with each wall of said divided track groove and successively being in rolling contact with said worm gear as said carrier member is rotated, and
   adjustment means operable to displace said track members to vary the radius of the contact path between said rolling elements and the walls of said divided track groove, thereby varying the transmission ratio of the roller worm gear arrangement.

2. An arrangement as defined in claim 1, wherein said adjustment means comprises;
   outer support means to support the respective outer circumference of said annular track members,
   inner support means to support the respective inner circumferences of said annular track members and
   displacement means to vary the axial spacing between said inner and said outer support means to vary the pressure angle between said rolling elements and said annular track members and to vary the radius of said contact path.

3. An arrangement as defined in claim 1, comprising;
   axially displaceable annular outer support members mounted co-axially with said input shaft to support the respective outer circumferences of said annular track members,
   axially displaceable annular inner support members mounted co-axially with said input shaft to support the respective inner circumferences of said annular track members, said outer and inner support members being arranged in co-operating pairs to support each annular track member and,
   displacement means to vary the axial spacing between said inner and said outer support members of each of said co-operating pairs and simultaneously to vary the pressure angle between said rolling elements and said annular track members and to vary the radius of said contact path.

4. An arrangement as defined in claim 3, wherein each of said annular track members comprises a conical cup spring member.

5. An arrangement as defined in claim 3, wherein said displacement means displaces said annular track members to vary the angle defined therebetween.

6. An arrangement as defined in claim 3, wherein said input shaft comprises a tubular portion and, the arrangement further comprises:
   at least two axially displaceable feather keys spaced uniformly apart on the circumference of said annular shaft portion and located in respective longitudinal slots defined therein,
   an axially displaceable adjusting rod mounted within said tubular shaft portion,
   a conical member provided on said adjusting rod and engaging said feather keys,
   axially opposite end portions of each of said feather keys projecting radially outwards of said tubular shaft portion and defining pairs of oppositely inclined, mutually facing surfaces and respectively engaging further inclined surfaces of said inner and outer support members, displacement means to displace said adjusting rod axially along said hollow input shaft, whereby said conical member displaces said feather keys radially of said shaft to engage said oppositely inclined and said further inclined surfaces and relatively displace said inner and said outer support members of each of said co-operating pairs simultaneously to vary both said pressure angle and the radius of said contact path.

7. An arrangement as defined in claim 1, wherein said input shaft comprises a pair of axially aligned hollow input shaft members supporting the outer circumferences of respective ones of said pairs of annular track members and further comprising a pair of tubular members mounted within respective ones of said hollow shaft members and axially displaceable relative thereto, said tubular members supporting the inner circumferences of respective ones of said pair of annular track members, a driver pin rotationally interlocking said shaft members and said tubular members, a pair of rotatable annular threaded members each having internal threaded positions engaging respective ones of said tubular members and external threaded portions engaging respective ones of said hollow shaft members, said internal and external threaded portions of each of said annular threaded members having different pitches, a rotatable spindle mounted within said tubular members and maintaining said hollow shaft members in axial alignment, said rotatable spindle rotationally interconnecting said pair of annular threaded members, whereby said annular threaded members rotate in synchronism and whereby rotation relative to the respective input shaft member of either one of said annular threaded members axially displaces co-operating pairs of said tubular members and said hollow shaft members relatively to one another to vary the pressure angle and the radius of the contact path between said roller members and said annular track members.

8. An arrangement as defined in claim 7, wherein the outer circumferential edge surfaces of each of said annular track members respectively define opposite walls of said divided track groove.

9. An arrangement as defined in claim 8, wherein each of said outer circumferential edge surfaces is concave.

10. An arrangement as defined in claim 1, wherein said input shaft comprises a pair of axially aligned hollow input shaft members supporting the outer circumferences of respective ones of said pair of annular track members, the inner circumferential edge portions of each of said annular track members defining respective first conical recess and inner circumferential edge portions of the respective hollow input shaft members adjacent the respective annular track members defining further conical recesses, respective ones of said first conical recesses and said further conical recesses abutting against each other to define an inner circumferential groove and the arrangement further comprising interlocking means to rotationally interlock said annular track members, rings of balls running in respective ones of said circumferential grooves, an axially displaceable adjusting rod extending into each hollow input shaft member and maintaining the respective input shaft members in axial alignment, said adjusting rod being provided with conical run-up members which respectively engage the inner circumferences of respective ones of said rings of balls whereby, when said adjusting rod is axially displaced, said rings of balls are radially displaced by interaction with respective ones of said conical run-up members to relatively displace said annular track members to vary the pressure angle and the radius of the contact path between said roller members and said annular track members.

11. An arrangement as defined in claim 1, wherein said input shaft comprises a pair of axially aligned hollow input shaft members supporting the outer circumferences of respective ones of said annular track members, each of said annular track members having a basically conical shape with a concavely curved generatrix, the inner circumferential edges of said annular track members abutting against each other and defining respective conical recesses which are oppositely inclined and form an inner circumferential groove and the arrangement further comprising a ring of balls running in said inner circumferential groove, a non-rotatable axially displaceable adjusting rod maintaining said hollow input shaft members in axial alignment, said adjusting rod being provided with a conical run-up member which engages the inner circumference of said ring of balls whereby, when said adjusting rod is axially displaced, said ring of balls is radially displaced by interaction with said conical run-up member to relatively displace said annular track members to vary the pressure angle and the radius of the contact path between said roller members and said annular track members.

12. An arrangement as defined in claim 1, wherein said input shaft comprises a pair of axially aligned hollow input shaft members supporting the outer circumferences of respective ones of said pair of annular track members, the arrangement further comprising a pair of annular inner support members mounted co-axially of said input shaft members and axially displaceable with respect to each other, said annular inner support members supporting the respective inner circumferences of said annular track members and the outer annular surfaces of said inner support members being provided with radially extending run-up ramps, a tapered supported ring mounted co-axially of said hollow input shaft members and located between said annular track members to mutually support said annular track members near their outer edges, adjacent portions of said hollow input shaft members being provided with respective collar portions provided with radially extending run-up ramps respectively adjacent said run-up ramps on said outer annular surfaces of said inner support members, a ring of balls located between each of said adjacent run-up ramps, a coupling shaft extending through each of said hollow input shaft members to rotationally interlock said hollow input shaft members and maintain said hollow input shaft members in axial alignment whereby, when the torque transmitted by said input shaft members varies, the rings of balls are displaced to axially displace said annular inner support members relative to one another and thereby vary the pressure angle and the radius of the contact path between said roller members and said annular track members.

13. An arrangement as defined in claim 12, wherein a pair of cylindrical members are located co-axially of said hollow input shaft members and interconnect the outer circumferential portion of respective ones of said annular track members and respective ones of said hollow input shaft members.

14. An arrangement as defined in claim 12, wherein said coupling shaft extending through each of said hollow input shaft members is axially displaceable and is provided with a pair of conical run-up members, the arrangement further comprising two rings of segmental members mounted co-axially of said coupling shaft, the inner circumferential surface of each of said rings of segmental members being conical and engaging a respective one of said conical run-up members, each of said segmental members having a conically inclined inner annular surface engaging a correspondingly inclined conical surface of a respective one of said annular inner support members, and each of said segmental members having a conically inclined outer annular surface engaging a correspondingly inclined conical surface of a respective one of said hollow input shaft members, respective resilient ring members embracing each of said rings of segmental members to urge said segmental members radially inwards whereby, when said coupling shaft is axially displaced, said segmental members are displaced radially by interaction with said conical run-up members to axially displace said annular inner support members relative to one another and thereby vary the pressure angle and the radius of the contact path between said roller members and said annular track members.

15. An arrangement as defined in claim 10, wherein each of said conical run-up members is defined by a nonlinear generating line, whereby a predetermined relationship is established between the axial displacement of said adjusting rod and the consequent variation of said pressure angle.

16. An arrangement as defined in claim 1, wherein each of said roller elements is rotatably mounted on said carrier member by means of a roller shaft and each roller element is provided with a profile having an arcuate convex curvature which extends to points on the profile close to the respective roller shaft.

17. An arrangement as defined in claim 1, wherein each of said roller elements comprises a ball and said carrier member comprises a cage ring.

References Cited

UNITED STATES PATENTS

| | | | |
|---|---|---|---|
| 1,112,711 | 10/1914 | Martins | 74—796 X |
| 1,380,006 | 5/1921 | Nielsen | 74—796 |
| 1,565,732 | 12/1925 | Goddard | 74—424.5 X |
| 2,696,888 | 12/1954 | Chillson et al. | 74—796 X |
| 2,853,899 | 9/1958 | Graham et al. | 74—796 |
| 2,973,671 | 3/1961 | Elkins | 74—796 |
| 3,242,755 | 3/1966 | Kuehnle | 74—424.5 |
| 3,293,947 | 12/1966 | Chery | 74—796 |
| 3,537,334 | 11/1970 | Gilbert | 74—416 X |

CARLTON R. CROYLE, Primary Examiner

T. C. PERRY, Assistant Examiner

U.S. Cl. X.R.

74—416, 424.5